Patented July 28, 1936

2,049,134

UNITED STATES PATENT OFFICE 2,049,134

METHOD OF MAKING BILIRUBIN

Earl A. Peterman, Detroit, Mich.

No Drawing. Application July 1, 1933,
Serial No. 678,733

7 Claims. (Cl. 260—46)

My invention relates to a novel method of preparing bilirubin and, more particularly relates to the preparation of this substance from bile.

Bilirubin is a pigment or coloring matter formed by the animal body and synthesized, together with iron and certain protein into the hemoglobin of the red blood cells. These cells are constantly breaking down in the body and the iron, together with the protein are retained in the blood while the pigment fraction is secreted by and excreted through the liver and appears in the bile. Heretofore, due to its lack of stability when dissolved in a solvent such as bile, bilirubin could not be separated therefrom and the only source of this substance was from gall stones from which it was removed by a long and expensive process which has been long known to scientists.

Broadly considered, my invention contemplates the stabilizing of bilirubin as it is formed, for instance, in bile washing away water soluble impurities, removing the stabilizing agent from its association with the bilirubin and thereafter alternately dissolving and extracting the bilirubin until it is microscopically pure.

More specifically, the primary object of my invention is to prepare bilirubin from bile.

Another object of my invention is to so process bile and bilirubin contained therein that microscopically pure bilirubin may be obtained therefrom.

Another object of my invention is to provide a method of processing bile so that it may be kept until such times as it is found to be desirable to extract bilirubin therefrom.

Other objects and advantages of my invention will be apparent from the following specification and from the appended claims.

Obviously the supply of bile to be found in slaughter houses and similar places is far more extensive than the supply of gall stones, and my invention comprises a novel method for obtaining bilirubin from bile, the result of its use being to decrease the cost of bilirubin not only because my method of producing it is less expensive than the former method but also because the source of supply is more abundant and less expensive.

In carrying out my method of preparing bilirubin the bile, as soon as it is removed from the gall bladder of the animals, such as cattle, sheep, hogs, or other animals of which there is a large supply, is alkalized with ammonium hydroxide, the amount of ammonium hydroxide used being immaterial provided a sufficient amount is mixed with the bile to get an alkaline reaction to a litmus paper test. Five percent calcium hydroxide is added until a heavy precipitate forms, this precipitate carrying down the bilirubin as stabilized and insoluble calcium bilirubinate.

The bile as thus processed may be stored in substantially air-free containers for several months and transported as found desirable. Thus a supply of bile may be acquired during the operating periods of a slaughter house and processed at a uniform rate if desired during such period and during the time the slaughter house may be shut down, or it may be transported to laboratories distant from the slaughter house and there further processed. Optionally the supernatant liquid may be removed and the calcium bilirubinate stored in a dry condition.

When it is desired to further process the calcium bilirubinate, if stored moist, the supernatant liquid is removed or, if stored dry, the precipitate is washed with water until the washings give a negative Pettenkofer test for bile salts, thus indicating that the bile salts have been eliminated from the precipitate. This test is well known to those skilled in the art and a further description thereof herein is not believed necessary.

The precipitate, free of bile salts, may then be suspended in deoxygenated distilled water; that is, water which has been boiled for 20 minutes and cooled, to which water has been added one-tenth gram of sodium sulphite per liter. To the suspended precipitate hydrochloric acid is added until it is acid to the litmus test. The suspended precipitate is then allowed to settle and the supernatant liquid removed, after which the residue is washed with deoxygenated water until the washings give a negative test for calcium and for chlorides, at which time the residue may be partially dried on filter paper. After the residue is partially dried it is extracted with warm 95% ethyl alcohol for about thirty minutes, after which it is filtered and well washed with alcohol. The residue may then be dried and pulverized.

After the residue is dried and pulverized it is ready for the cleansing part of the process. It is extracted with chloroform until it yields no further color. To the chloroform extract two volumes of 95% ethyl alcohol is added and thereafter the chloroform removed from the mixture by vacuum distillation or evaporation over a water bath of below 72° C. As the chloroform is removed the bilirubin precipitates out while any remaining impurities such as bile acids or cholesterol remains in the alcohol. The precipitate then should be filtered and washed with hot alcohol after which the bilirubin is redissolved in warm chloroform and the last above two mentioned steps repeated, namely: two volumes of 95% alcohol are added to the chloroform extract and the chloroform removed from the mixture by vacuum distillation or evaporation, after which the mixture is filtered and the precipitate is washed well with hot alcohol. Thereafter the precipitate is partially dried and dissolved again in warm chloroform or dimethylaniline and the solvent evaporated, as a result of which the bilirubin crystallizes out. These crystals should be filtered and washed with alcohol and they are then ready for use. If under a microscopic test the product is not pure, the crystals should be again dissolved in chloroform and carried through the cleansing part of the process again.

Various modifications may be made in the above described embodiments of my invention without departing from the spirit or scope thereof as set forth in the following claims. Where herein used in the claims the term "mixture" is to be construed as including both chemical combinations and physical mixtures.

What is claimed is:

1. The method of preparing bilirubin which comprises stabilizing bilirubin in bile by reacting the bile with calcium hydroxide to form calcium bilirubinate, washing away the water soluble constituents of bile, acidifying the calcium bilirubinate, and thereafter successively dissolving and extracting the bilirubin from chloroform and washing with alcohol.

2. The method of preparing bilirubin which comprises stabilizing bilirubin in bile by reacting the bile with calcium hydroxide to form calcium bilirubinate, washing away the water soluble constituents of bile, acidifying the calcium bilirubinate while maintaining the bilirubin out of contact with oxygen, and thereafter successively dissolving and extracting the bilirubin from chloroform and washing with alcohol.

3. The method of preparing bilirubin which comprises alkalizing bile with ammonium hydroxide as soon as it is removed from the gall bladder of an animal; maintaining the alkalized bile in an air free container till ready for further processing; precipitating calcium bilirubinate from the alkalized bile with a 5% calcium hydroxide precipitant; removing the supernatant liquid; washing the precipitate with water until the washings give a negative Pettenkofer test for bile salts; suspending the precipitate in deoxygenated distilled water containing one-tenth gram of sodium sulphite per liter; acidifying the suspended precipitate with hydrochloric acid; settling out the precipitate and removing the supernatant liquid; washing the residue with deoxygenated water until the washings give a negative test for calcium and for chlorides; partially drying the residue on filter paper; extracting the residue with warm 95% ethyl alcohol thereby dissolving the alcohol soluble impurities; filtering the extract and washing the residue with alcohol; and drying and pulverizing the residue.

4. The method of preparing bilirubin which comprises precipitating calcium bilirubinate from alkalized bile with a 5% calcium hydroxide precipitant, removing the supernatant liquid, removing the bile salts; removing the calcium and chlorides, partially drying the residue; extracting the residue with warm 95% ethyl alcohol thereby dissolving the alcohol soluble impurities, filtering the extract and washing the residue with alcohol, drying and pulverizing the residue; and thereafter cleansing the same.

5. The method of preparing bilirubin which comprises precipitating calcium bilirubinate from alkalized bile with a 5% calcium hydroxide precipitant; washing the precipitate until the bile salts are removed; suspending the precipitate in an oxygen free liquid containing sodium sulphite; acidifying the suspended precipitate; settling out of the suspended precipitate; washing the latter with deoxygenated water until the washings are free of calcium and chlorides and partially drying the residue; extracting the residue with warm 95% ethyl alcohol thereby dissolving the alcohol soluble impurities; filtering the extract and washing the residue with alcohol; and drying and pulverizing the residue.

6. The method of preparing bilirubin which comprises alkalizing bile with ammonium hydroxide as soon as it is removed from the gall bladder of an animal; maintaining the alkalized bile in an air free container till ready for further processing; precipitating calcium bilirubinate from the alkalized bile with a 5% calcium hydroxide precipitant; removing the supernatant liquid; washing the precipitate with water until the washings give a negative Pettenkofer test for bile salts; suspending the precipitate in deoxygenated distilled water containing one-tenth gram of sodium sulphite per liter; acidifying the suspended precipitate with hydrochloric acid; settling out the precipitate and removing the supernatant liquid; washing the residue with deoxygenated water until the washings give a negative test for calcium and for chlorides; partially drying the residue on filter paper; extracting the residue with warm 95% ethyl alcohol thereby dissolving the alcohol soluble impurities; filtering the extract and washing the residue with alcohol; and drying and pulverizing the residue.

7. The method of preparing bilirubin which comprises precipitating calcium bilirubinate from alkalized bile with a 5% calcium hydroxide precipitant; washing the precipitate until the bile salts are removed; suspending the precipitate in an oxygen free liquid containing sodium sulphite; acidifying the suspended precipitate; settling out the suspended precipitate; washing the latter with deoxygenated water until the washings are free of calcium and chlorides and partially drying the residue; extracting the residue with warm 95% ethyl alcohol thereby dissolving the alcohol soluble impurities; filtering the extract and washing the residue with alcohol; and drying and pulverizing the residue.

EARL A. PETERMAN.